Figure 1:
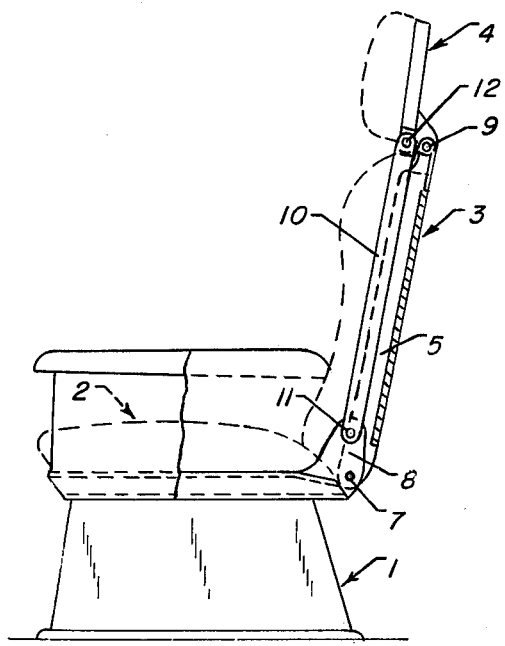

United States Patent [19]

Hogan et al.

[11] 4,040,661
[45] Aug. 9, 1977

[54] VEHICLE SEAT WITH HEADREST MOVEMENT RESPONSIVE TO SEAT BACK TILTING

[75] Inventors: Gerard T. Hogan, Southington; Kirby B. Weik, Litchfield, both of Conn.

[73] Assignee: UOP Inc., Des Plaines, Ill.

[21] Appl. No.: 642,520

[22] Filed: Dec. 19, 1975

Related U.S. Application Data

[63] Continuation-in-part of Ser. No. 520,311, Nov. 4, 1974, Pat. No. 3,929,374.

[51] Int. Cl.$^2$ .............................................. A47C 3/00
[52] U.S. Cl. ........................................ 297/284; 297/61
[58] Field of Search ........................... 297/61, 284, 85

[56] References Cited

U.S. PATENT DOCUMENTS

| 369,558 | 9/1887 | Scarritt et al. | 297/61 |
|---|---|---|---|
| 469,357 | 2/1892 | Meigs | 297/61 |
| 711,412 | 10/1902 | Archambeault | 297/61 |
| 788,656 | 5/1905 | Landkamer | 297/61 |
| 2,448,860 | 9/1948 | Collins | 297/284 |
| 2,550,831 | 5/1951 | Lingenfelter | 297/284 |
| 3,807,794 | 4/1974 | Bever | 297/284 |
| 3,938,858 | 2/1976 | Drabert | 297/284 |

*Primary Examiner*—James T. McCall
*Attorney, Agent, or Firm*—James R. Hoatson, Jr.; Philip T. Liggett; William H. Page, II

[57] ABSTRACT

A tilting, adjustable passenger seat back is provided with an angularly adjustable upper headrest section which has tilting linkage and a hinge connection to the upper part of the seat back such that when the back is in a generally upright position, the headrest section is back and out of the way of a passenger's head and shoulders; however, when the seat back is moved to a recline position, the headrest section will rotate forward to provide support for the head while the passenger is in the recline position. A modified construction also has additional linkage which provides for a lumbar support that moves along with recline movement to be primarily effective to adjust seat back cushioning for upright positioning of the seat back and out of the way for the recline position.

3 Claims, 4 Drawing Figures

VEHICLE SEAT WITH HEADREST MOVEMENT RESPONSIVE TO SEAT BACK TILTING

CROSS-REFERENCE TO RELATED APPLICATIONS

This application is a continuation-in-part of copending application Ser. No. 520,311, filed Nov. 4, 1974, now U.S. Pat. No. 3,929,374.

The present invention relates to a special tilting seat back construction for a vehicle seat which provides an angularly adjustable headrest section.

More particularly, the invention is directed to a tilting seat back arrangement where there is automatic movement of a headrest section to have such section out of the way when the back is in a generally upright position and tilted forward for head support when the seat back is in the recline position.

A further modification of the seat back has additional linkage to the headrest adjustment means such that there is maximum lumbar support when the seat back is in the upward positions but minimal, or non-operative, when the seat back is in a recline position.

It is recognized that there are many types of linkages and operations for reclining the backs of passenger seats, as well as various types of mechanically and pneumatically operated lumbar sections for a seat back; however, it is not believed that there are present designs or operations where there is a lumbar adjustment tied into the linkage for adjusting a tilting headrest section for a reclining back vehicle seat. Also, known headrest adjustment means have been made responsive to the tilting of both the seat and back portions of a seat while, conversely, the present headrest tipping arrangement is responsive only to the recline of a seat back section.

In airplane and other vehicle passenger seating, it has been found that headrest sections of seat backs frequently impinge upon the shoulder and/or the head of a passenger, particularly where the occupant is above average in height. Thus, from a passenger comfort aspect, it is preferable to have the headrest section out of the way while the seat back is in the generally upright positionings. On the other hand, it is desirable to have the headrest section move slightly forward when the seat back is in a recline position. It appears that a seat occupant naturally assumes a somewhat curved position when a seat back is put in a recline position and there is greater comfort by having a headrest section that will be moved and tilted forward for the recline positionings. As a further advantage, the forward tilting of the headrest section helps to provide more space to the rear of the seat upon seat back recline.

It may therefore be considered a principal object of this invention to provide a seat back construction which has a separate tiltable upper headrest section and integrated linkage means that will cause the latter to be in a straight extended, out-of-the-way position when the back is in the generally upright location but will be caused to tilt forward when the seat back is being lowered to various recline positions.

It is a further object of the present invention to integrate additional linkage means with the headrest tilting linkage members such that the lumbar portion of a seat back will have an outwardly projecting back support zone when the seat back is in the more upright positions and then move into the seat back, or into a collapsed orientation, when the seat back is moved into the recline positionings. From a comfort aspect, it seems that a lumbar support or seat back projection is less desirable, or even undesirable to some passengers, when the seat back is more or less fully reclined.

In one embodiment, the present invention provides in a vehicle passenger seat having a seat section, seat support framing and a reclining seat back, the improved construction to provide a movable headrest section that comprises in combination, (a) an elongated tilting seat back section having a hinged connection at its lower end to a fixed location or non-moving seat support framing, (b) a relatively short tilting headrest section having a hinged connection from its lower portion to the rearward part of the upper end portion of said seat back section and forming an extended portion for the latter, (c) a fixed length, stiff linking member connecting to a fixed position, non-translating, lower pivot means on the non-moving seat support framing at a position spaced upwardly from said hinged connection for said back section, and said linking member extending upwardly to an upper pivot means on said headrest section which is spaced from and positioned forward of the hinged connection between the upper part of said seat back section and said headrest section, and (d) said linking member positioned to be generally parallel to the tilting seat back section, such that as the latter is tilted from a generally upright position to a recline position there is a resulting translation of the top end portion of the seat back section relative to said upper pivot point means between said linking member and said headrest section and a resulting forward tilting of the latter section with respect to the back section.

Typically, in a preferred arrangement, there will be two linking members to the tiltable headrest section, with a linking member extending along each side of the seat back section and the upper and lower pivot points for the linking member will be generally in line with the side framing of the seat back section such that straight, or relatively straight, linking members can be utilized to extend between the seat support framing and the lower forward portions of the tilting headrest section.

In a modified arrangement, there can also be additional linkage extending outwardly from the two side linking members or from the lower pivot point for such members and connecting pivot means from the sides of the seat back framing such that there can be a transverse lumbar support bar which will move in and out with respect to the seat back section and in a slight arcuate movement responsive to tilting movements of the seat back section. For example, arm means at each end of the transverse lumbar support member which pivotally connect to the same lower pivot points for the linking members and which also have longitudinal slot means to accommodate fixed pin means from the seat back framing will provide for the translation of the transverse lumbar member responsive to relative movement between the linking members and the seat back framing as the seat back section is tilted. The lumbar support member, or bar, will be constructed and arranged so as to be embedded below the surface of the seat back cushioning at a zone which will be in the lumbar region of the seat occupant such that the cushioning and upholstery will be pushed outwardly to give back support when the seat back is in a generally upright position and conversely, the support bar will be rotated and retracted a short distance with respect to the seat back framing to in turn lessen its projection in the lumbar region as the seat back section is tilted into a recline position.

Reference to the accompanying drawing and the following description thereof will assist in describing the present invention with respect to an adjustable headrest section and lumbar support means, as well as set forth additional advantageous features in connection therewith.

Figure 2:
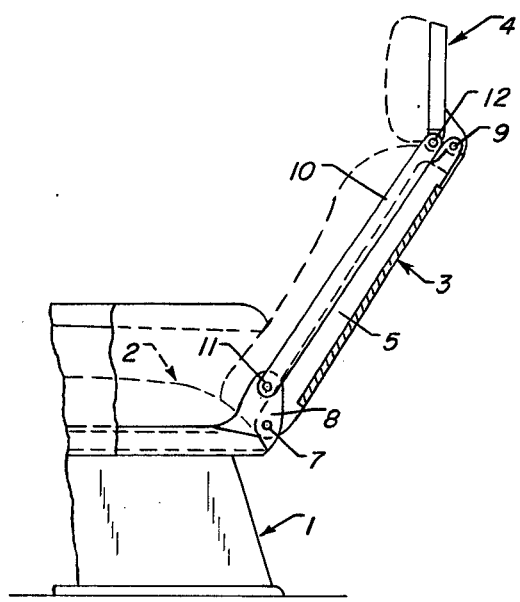

FIGS. 1 and 2 of the drawing illustrate diagrammatically the location of pivot point means and linking means to effect the movement of an adjustable, tiltable headrest section responsive to seat back tilting.

Figure 3:
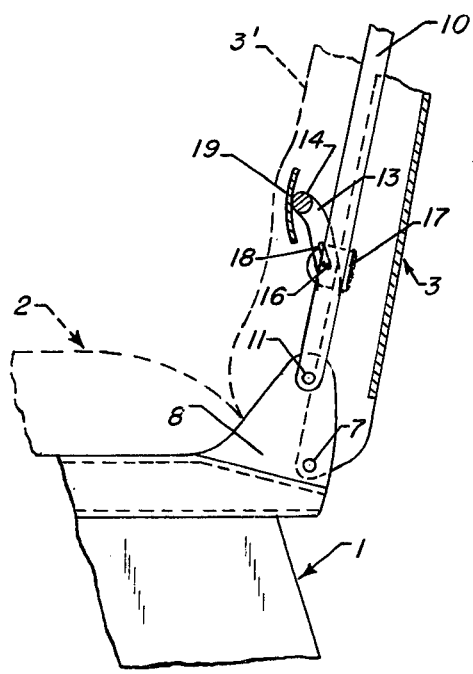
Figure 4:
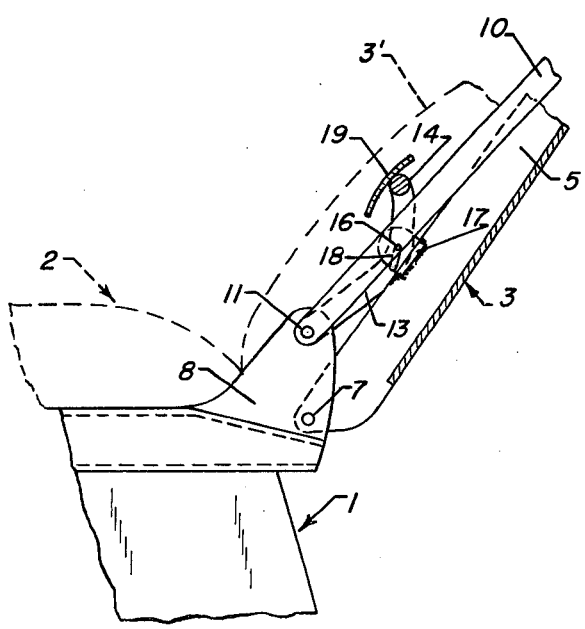

FIGS. 3 and 4 of the drawing indicate diagrammatically how additional linkage means in the lumbar region of a seat back section and between the latter and the pivot point for the headrest linking means may provide for lumbar support adjustment responsive to seat back tilting.

Referring now particularly to FIGS. 1 and 2 of the drawing there is indicated in a diagrammatic manner fixed seat support framing 1 adapted to hold seating means at 2 and a tilting seat back section 3, which in turn is provided with an extended movable headrest section 4. The seat back section 3 is illustrated as having side framing portions 5 which pivotally, or hingedly, connect through pivot means 7 with bracket means 8 on seat support framing 1. Thus, back section 3 will pivot about the pin means 7 when being lowered or raised in connection with recline positioning.

There is also indicated a hinged connection at 9 between the upper end portion of seat back framing 5 and a lower rearward portion of the headrest section 4 such that the latter can be separately tilted with respect to the seat back section 3. In addition, there will be a fixed length linking member 10 extending between a pivot 11 which is located at an elevated portion of the seat support framing 1 and extends to another upper pivot connection 12 at a lower forward portion of headrest section 4. Thus, as may be seen from comparing the generally upright back section positioning of FIG. 1 with a recline position in FIG. 2, there will be noted the relative movements between the fixed length linking member 10 and the framing 5 for the seat back section 3 as the latter pivots about hinge connection 7. The actual effect is that pivot connection 12 is caused to be translated relative to the pivot or hinge connection 9 when the back section 3 is reclined and the headrest section 4 is caused to tilt forwardly with respect to the upper end of seat back section 3. This arrangement provides the desired forward tilting of the headrest as a seat occupant moves the seat back into a recline position and, conversely, when the seat back section is lifted to a generally upright position, such as in FIG. 1, the headrest section 4 moves or tilts backwardly. As heretofore noted, it is generally desired from a comfort angle, particularly for tall individuals, to have the headrest section rearward and out of the way with respect to the seat occupant's head and shoulders when the seat back is in the "up" position.

It is to be understood that the framing and linkage indicated in FIGS. 1 and 2 is diagrammatic and not limiting in any way with respect to the means for accomplishing the tilting of the headrest section 4 responsive to recline movements for the back section 3. Typically, a stiff linking member 10 will be provided on each side of the seat back section 3 such that the two members will extend generally parallel with the side framing portions 5 for the seat back section.

A suitable hydraulic seat back adjustment lock or a mechanical seat back adjustment lock means will be connected between the seat support framing 1 and the seat back framing 5 in a conventional manner, and is not shown in the present drawing. Such locking means may be placed under the seating 2 or in a generally vertical location along the lower portion of the seat back section 3, and again it is not intended to limit the present invention to the use of any one type of recline seat lock or to any one location for such lock means. Also, various types of cushioning and upholstery means may be provided in connection with the seating, seat back and headrest sections without effecting the scope of the present invention.

Referring now to FIG. 3 of the drawing, there is shown a somewhat enlarged view of the lower portion of the seat back section 3 with its lower side framing 5 and a linking member 10, each of which connect to the fixed seat base portion 1 at the respective pivot connections 7 and 11, all in the same manner as indicated in FIGS. 1 and 2 of the drawing. In addition to this linkage arrangement which operates the tiltable headrest section, there is indicated in a modified embodiment that arm members 13 at each end of a transverse lumbar support member 14 will provide that the latter can be moved in and out with respect to the seat back framing 5. In this specific arrangement, the arm members 13 will be fixedly connected to the ends of lumbar bar member 14 and there will be pivoted connections at 11, which is the same pivot point as for the lower ends of the linking members 10 which are being provided along each side of the seat back section 3. In order to control the movement of transverse bar member 14 there will also be a pin means 16 fixed to a projecting portion 17 of each portion of side framing 5 which will pass through a longitudinal slot 18 in each arm member 13. This arrangement provides that any relative movement between linking members 10 and the side framing 5 will cause pin means 16 to bear against the sides of slots 18 and, in turn, move arms 13 and the transverse bar 14.

As best shown in FIG. 4 of the drawing, there is indicated a tilting or recline position for the seat back section 3 with respect to the seating area 2 as well as with respect to the seat support framing 1, and the resulting relative movement between linking member 10 and side framing 5 such that the pin means at 16 attached to seat framing 5 will have moved upwardly with respect to the slot 18 and caused the upper portions of arm members 13 and the lumbar bar 14 to move a short distance inwardly with respect to the seat back framing. As a result, the lumbar member 14 will reduce its pushing-out effect on back cushioning at 3'. For comparative purposes, it will be noted in FIG. 3 that the cushioning at 3' is pushed outwardly in a lumbar supporting manner by reason of the lumbar member 14 being generally in its most outward position with respect to seat back framing and linking members 10. Referring back to FIG. 4 of the drawing, it will be seen that the translated position for bar 14 permits the back cushioning at 3' in the lumbar region of the seat occupant to be returned to a generally normal position in comparison to the contour for the generally upright position for the seat back framing.

From a comfort aspect, as well as from the operation resulting from the lumbar linkage, the present special arrangement having the lumbar arm means attaching the present linkage point for the headrest adjustment means effects a resulting movement where the maximum lumbar support is effected when the seat back section 3 is in the upright position and is lessened when the seat back 3 is in the recline position. Various types of cushioning arrangements may be provided to work in combination with the moving bar means 14 such that the lumbar section of the seat back will be pushed in and out from the bar movement; however, in certain embodiments, it may be advisable to utilize a generally rigid or stiff member, such as a curved transverse member 19, to receive the movement and pressure from moving bar 14 and in turn translate the in-and-out movement for the lumbar adjustment means into the cushioning at 3'. Typically foam padding will be utilized under upholstery coverings in the seat back section of a vehicle passenger seat and at least a thin layer of foam or padding will be utilized between the member 19, or the transverse bar 14, and the outward surface of the seat back section at 3'. Actually, the transverse support bar 14 may comprise two or more sections, or it need not be a straight member to provide a desired lumbar support for a particular seat back configuration.

It is, of course, not intended to limit the present invention to the specific types of pin means or pivot means between the lumbar support arm members, the linking members and seat back framing, nor is it intended to limit the linkage to arm members of the particular design illustrated. In other words, various shapes, designs and configurations may be provided to effect the hinged linkage between the transverse bar means and the linking or pivot connections to the seat frame members as long as there is effected a similar movement resulting, in turn, from the relative longitudinal movements between the linking members and the seat back framing. The contours of the seat back and headrest framing, as well as for the attached padding, are also diagrammatic and can be modified to suit appearance and desired comfort.

We claim as our invention:

1. In a vehicle passenger seat having a seat section, seat support framing and a reclining seat back, the improved construction to provide a movable headrest section, which comprises in combination,
   a. an elongated tilting seat back section having a hinged connection at its lower end to a fixed location on non-moving seat support framing,
   b. a relatively short tilting headrest section having a hinged connection from its lower portion to the rearward part of the upper end portion of said seat back section and forming an extended portion for the latter,
   c. a fixed length, linking member connecting to a fixed position, non-translating, lower pivot means on the non-moving seat support framing at a position spaced upwardly from said hinged connection for said back section, and said linking member extending upwardly to an upper pivot means on said headrest section which is spaced from and positioned forward of the hinged connection between the upper part of said seat back section and said headrest section,
   d. said linking member positioned to be generally parallel to the tilting seat back section, such that as the latter is tilted from a generally upright position to a recline position there is a resulting translation of the top end portion of the seat back section relative to said upper pivot point means between said linking member and said headrest section and a resulting forward tilting of the latter section with respect to the back section, and
   e. a transverse lumbar support bar extending across the lower portion of said tilting seat back section in the zone of the lumbar region of a seat occupant, said support bar having fixedly connected arm members which extend downwardly to pivotally connect with the seat support framing to thereby provide for an arcuate movement of the lumbar support bar about the connection points to the framing, longitudinal slot means being provided in the midportions of each of the arm members from the lumbar support bar, and fixed pin means from each side portion of said seat back section being provided to extend through the respective slot means for said arm members whereby the tilting movement of the seat back section provides a relative movement between the seat back framing and said arm members from the fixed pin means in said slot means and there is a resulting translation of the connecting lumbar support bar to move with respect to the framing for the seat back section.

2. The seat of claim 1 further characterized in that a linking member is provided along each side portion of said seat back section for connection to said headrest section, whereby the latter is operated from two spaced linking members.

3. The seat of claim 1 further characterized in that a stiff but movable pressure distributing member is used in combination with said lumbar support bar to move seat back cushioning in and out responsive to the degree of projection of said lumbar support bar.

* * * * *